US005839406A

United States Patent [19]

Hall

[11] Patent Number: 5,839,406

[45] Date of Patent: Nov. 24, 1998

[54] BALANCE SHAFT SEAL RETAINER

[76] Inventor: Jeffrey D. Hall, 1216 Briar Ridge Rd., Henry, Va. 24102

[21] Appl. No.: 940,503

[22] Filed: Sep. 30, 1997

[51] Int. Cl.[6] .............................. F16F 15/10; F16H 37/06

[52] U.S. Cl. .................................... 123/192.2; 123/198 E

[58] Field of Search ............................ 123/192.2, 198 E; 277/35, 37, 235 B, 237 R

[56] References Cited

U.S. PATENT DOCUMENTS

| | | | |
|---|---|---|---|
| 3,904,211 | 9/1975 | Dega | 277/42 |
| 4,275,889 | 6/1981 | Butler et al. | 277/42 |
| 4,337,954 | 7/1982 | Backlin et al. | 277/237 R |
| 4,509,474 | 4/1985 | Schmuck | 123/192.2 |
| 4,523,553 | 6/1985 | Backlund | 123/192.2 |
| 4,611,503 | 9/1986 | Kocher | 74/603 |
| 4,793,301 | 12/1988 | Ishikawa | 123/192.2 |
| 4,905,299 | 2/1990 | Ferraiuolo et al. | 384/585 |
| 5,253,547 | 10/1993 | Yoneyama et al. | 74/604 |
| 5,542,387 | 8/1996 | Okubo | 123/192.2 |

*Primary Examiner*—David A. Okonsky

[57] ABSTRACT

A balance shaft seal retainer is provided having a cut out formed therein. The balance shaft seal retainer further includes at least one aperture formed therein. At least one bolt is included for being situated within the aperture of the retainer and screwably coupled within a threaded bore of an engine whereby the square cut out encompasses a balance shaft seal thereby precluding the inadvertent removal of the same.

4 Claims, 2 Drawing Sheets

BALANCE SHAFT SEAL RETAINER

BACKGROUND OF THE INVENTION

1. Field of the Invention

The present invention relates to seal retainers and more particularly pertains to a new balance shaft seal retainer for preventing the removal of a balance shaft seal from a timing belt assembly thereby precluding loss of oil.

2. Description of the Prior Art

The use of seal retainers is known in the prior art. More specifically, seal retainers heretofore devised and utilized are known to consist basically of familiar, expected and obvious structural configurations, notwithstanding the myriad of designs encompassed by the crowded prior art which have been developed for the fulfillment of countless objectives and requirements.

Known prior art seal retainers include U.S. Pat. No. 4,768,973; U.S. Pat. No. 4,930,822; U.S. Pat. No. 5,067,451; U.S. Pat. No. 4,128,283; U.S. Pat. Des. 337,715; and U.S. Pat. No. 4,905,299.

In these respects, the balance shaft seal retainer according to the present invention substantially departs from the conventional concepts and designs of the prior art, and in so doing provides an apparatus primarily developed for the purpose of preventing the removal of a balance shaft seal from a timing belt assembly thereby precluding loss of oil.

SUMMARY OF THE INVENTION

In view of the foregoing disadvantages inherent in the known types of seal retainers now present in the prior art, the present invention provides a new balance shaft seal retainer construction wherein the same can be utilized for preventing the removal of a balance shaft seal from a timing belt assembly thereby precluding loss of oil.

The general purpose of the present invention, which will be described subsequently in greater detail, is to provide a new balance shaft seal retainer apparatus and method which has many of the advantages of the seal retainers mentioned heretofore and many novel features that result in a new balance shaft seal retainer which is not anticipated, rendered obvious, suggested, or even implied by any of the prior art seal retainers, either alone or in any combination thereof.

To attain this, the present invention generally comprises an engine timing belt assembly including a shaft rotatably coupled within a cylindrical bore formed within an engine. For reasons that will become apparent hereinafter, the bore has an annular indentation formed thereabout. The shaft further has an exterior disk shaped pulley coupled in concentric relationship therewith and in rotatable communication with a timing belt of the timing belt assembly. The engine has a pair of threaded bores formed therein above the shaft. One of such threaded bores resides in a recess formed in the engine. As shown in FIGS. 2 & 3, a balance shaft seal is provided having a planar annular configuration. In use, the balance shaft seal is situated within the annular indentation about the shaft and between the pulley and the engine during use. Next provided is a balance shaft seal retainer having a planar generally square configuration with a front smooth planar face, a rear smooth planar face and a periphery formed therebetween. The periphery is defined by a linear top edge and a first linear side edge perpendicularly situated with respect to the top edge with a beveled corner formed therebetween. The periphery is further defined by a second side edge with a linear top extent perpendicularly situated with respect to the top edge and a bottom extent beveled inwardly from the top extent to a bottom edge of the periphery. The bottom edge has a square cut out formed therein and in communication therewith. The balance shaft seal retainer further includes a pair of apertures formed adjacent the top edge and respective sides edges of the periphery thereof. Also included is a ring shaped spacer with a planar configuration. Finally, a pair of bolts is provided for being situated within the apertures of the retainer and screwably coupled within the threaded bores of the engine. When the bolts are engaged with the engine, the spacer is situated about one of the bolts between the retainer and engine within the recess thereof. By this arrangement, the square cut out encompasses the balance shaft seal thereby precluding the inadvertent removal of the same.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new balance shaft seal retainer apparatus and method which has many of the advantages of the seal retainers mentioned heretofore and many novel features that result in a new balance shaft seal retainer which is not anticipated, rendered obvious, suggested, or even implied by any of the prior art seal retainers, either alone or in any combination thereof.

It is another object of the present invention to provide a new balance shaft seal retainer which may be easily and efficiently manufactured and marketed.

It is a further object of the present invention to provide a new balance shaft seal retainer which is of a durable and reliable construction.

An even further object of the present invention is to provide a new balance shaft seal retainer which is susceptible of a low cost of manufacture with regard to both materials and labor, and which accordingly is then susceptible of low prices of sale to the consuming public, thereby making such balance shaft seal retainer economically available to the buying public.

Still yet another object of the present invention is to provide a new balance shaft seal retainer which provides in the apparatuses and methods of the prior art some of the advantages thereof, while simultaneously overcoming some of the disadvantages normally associated therewith.

Still another object of the present invention is to provide a new balance shaft seal retainer for preventing the removal of a balance shaft seal from a timing belt assembly thereby precluding loss of oil.

Even still another object of the present invention is to provide a new balance shaft seal retainer that includes a cut out formed therein. The balance shaft seal retainer further includes at least one aperture formed therein. At least one bolt is included for being situated within the aperture of the retainer and screwably coupled within a threaded bore of an engine whereby the square cut out encompasses a balance shaft seal thereby precluding the inadvertent removal of the same.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
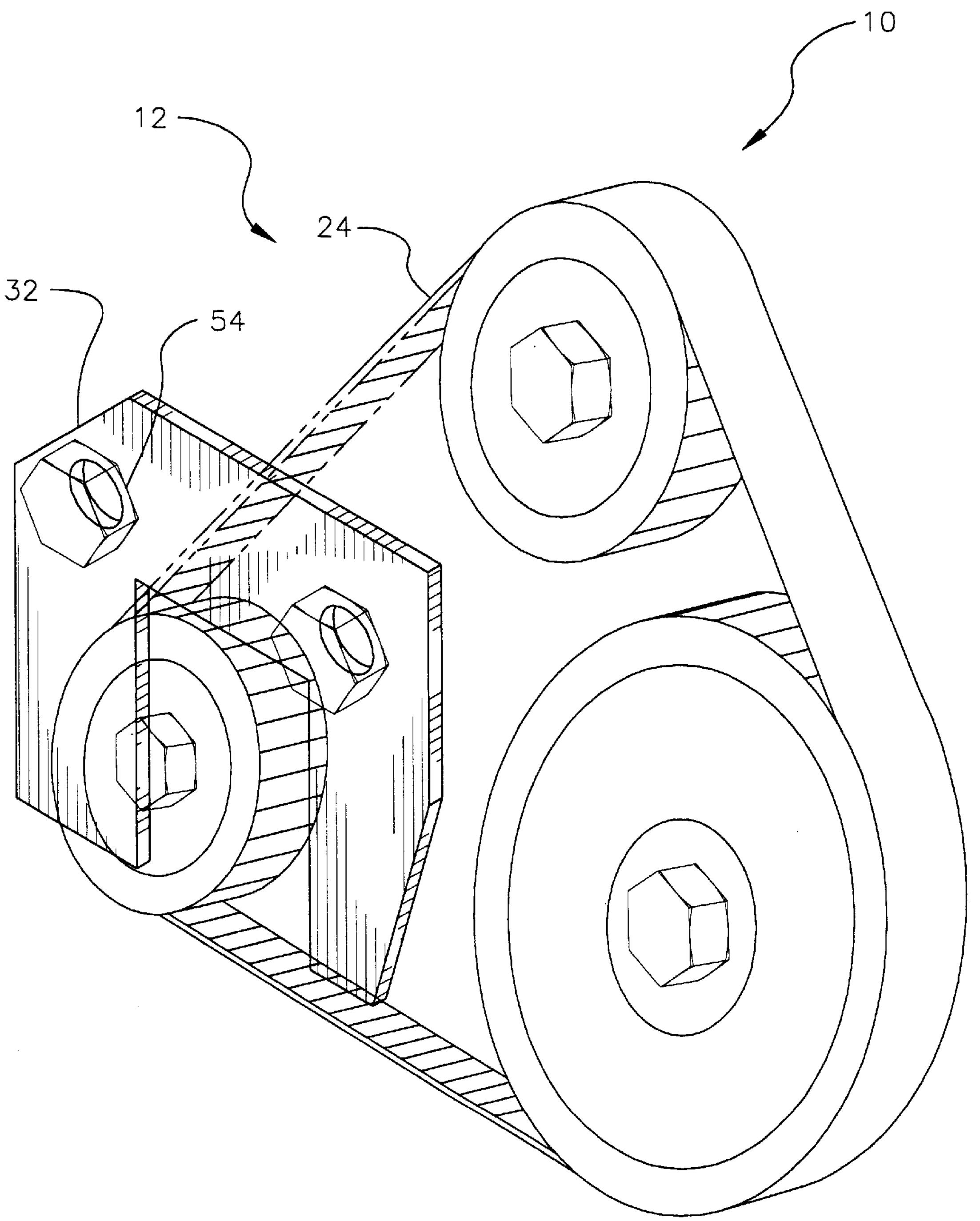
FIG. 1 is a perspective view of a new balance shaft seal retainer according to the present invention in use.
Figure 2:
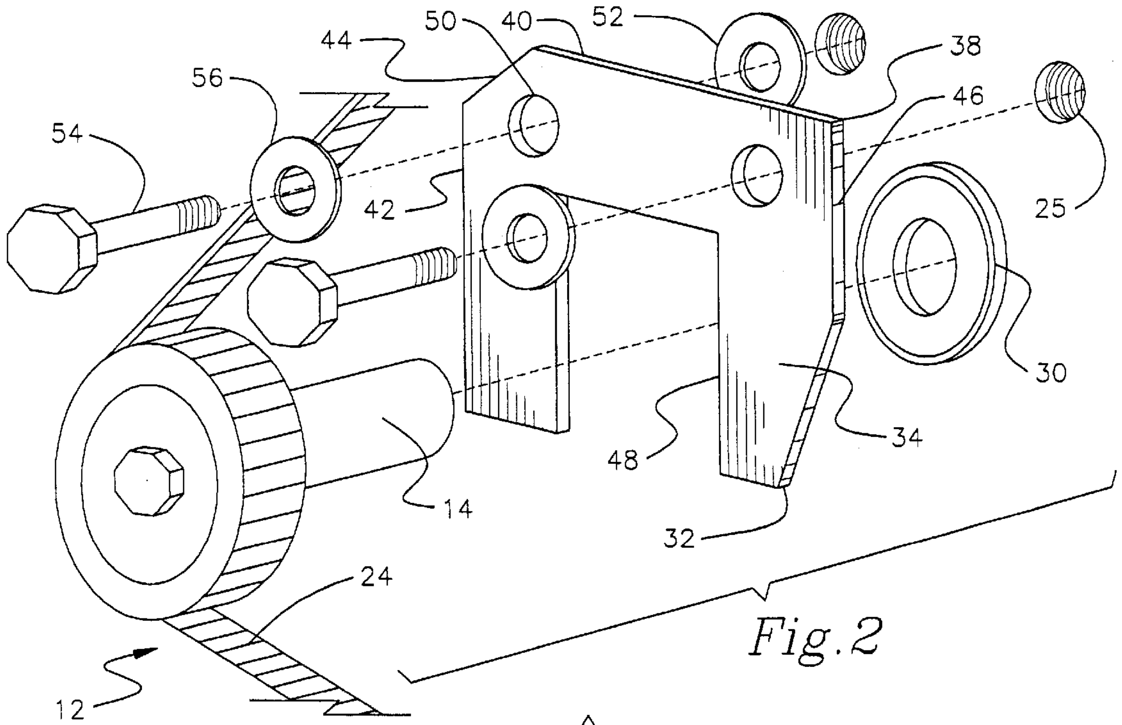
FIG. 2 is an exploded view of the present invention.
Figure 3:
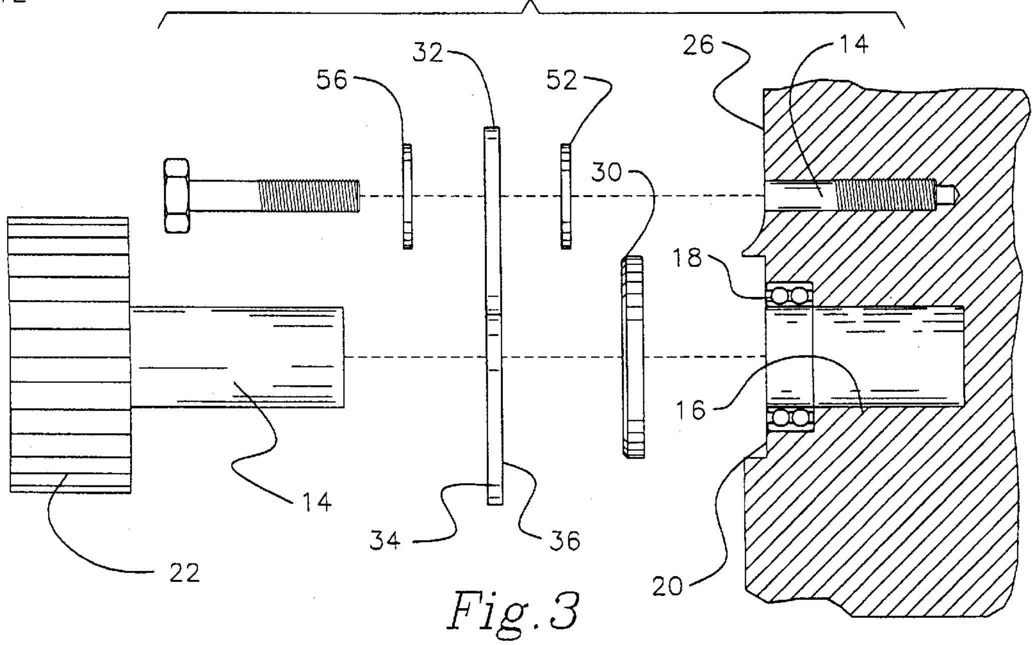
FIG. 3 is a cross-sectional view of the present invention.

With reference now to the drawings, and in particular to FIGS. 1 through 3 thereof, a new balance shaft seal retainer embodying the principles and concepts of the present invention and generally designated by the reference numeral 10 will be described.

The present invention, as designated as numeral 10, includes an engine timing belt assembly 12 including a shaft 14 rotatably coupled within a cylindrical bore 16 formed within an engine. The rotatability of the shaft is ideally enhanced by way of a plurality of bearings 18. For reasons that will become apparent hereinafter, the bore has an annular indentation 20 formed thereabout in coaxial relationship therewith. The shaft further has an exterior disk shaped pulley 22 coupled in concentric relationship therewith and in rotatable communication with a timing belt 24 of *p+12× the timing belt assembly. The engine has a pair of threaded bores 25 formed therein above the shaft. One of such threaded bores resides in a recess 26 formed in the engine. As such, the engine resembles a timing belt assembly and engine of a HONDA ACCORD or an ODYSSEY minivan.

As shown in FIGS. 2 & 3, a balance shaft seal 30 is provided having a planar annular configuration. In use, the balance shaft seal is situated within the annular indentation about the shaft and between the pulley and the engine during use. The seal functions to preclude the exiting of fluid, namely oil, from the engine.

Next provided is a balance shaft seal retainer 32 having a planar generally square configuration with a front smooth planar face 34, a rear smooth planar face 36 and a periphery 38 formed therebetween. The periphery is defined by a linear top edge 40 and a first linear side edge 42 perpendicularly situated with respect to the top edge with a beveled corner 44 formed therebetween. The periphery is further defined by a second side edge 46 with a linear top extent perpendicularly situated with respect to the top edge and a bottom extent beveled inwardly from the top extent to a bottom edge of the periphery. The retainer is preferably constructed from aluminum and measures approximately 2 1/16 inches long and 6/100 of an inch thick.

The bottom edge has a square cut out 48 formed therein and in communication therewith. The balance shaft seal retainer further includes a pair of apertures 50 formed adjacent the top edge and respective sides edges of the periphery thereof. It should be noted that the periphery of the retainer is specifically tailored to accommodate the engine structure of a HONDA ACCORD or ODYSSEY minivan.

Also included is a rigid ring shaped spacer 52 with a planar configuration. Finally, a pair of hex-bolts 54 is provided for being situated within the apertures of the retainer and screwably coupled within the threaded bores of the engine. When the bolts are engaged with the engine, the spacer is situated about one of the bolts between the retainer and engine within the recess thereof. Thus, the retainer is maintained flush with the seal. As an option, washers 56 may be situated about the bolts between a head thereof and the retainer.

By this arrangement, the square cut out encompasses the balance shaft seal thereby precluding the inadvertent removal of the same. The periphery of the square cut out ideally overlaps the seal to accomplish such.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A balance shaft seal retainer system comprising, in an engine timing belt assembly including a shaft rotatably coupled within a cylindrical bore formed within an engine wherein the bore has an annular indentation formed thereabout, the shaft having an exterior disk shaped pulley coupled in concentric relationship therewith and in rotatable communication with a timing belt of the timing belt assembly, the engine having a pair of threaded bores formed therein above the shaft, one of the threaded bores residing in a recess formed in the engine;

a balance shaft seal having a planar annular configuration, the balance shaft seal situated within the annular indentation about the shaft and between the pulley and the engine during use;

a balance shaft seal retainer having a planar generally square configuration with a front smooth planar face, a rear smooth planar face and a periphery formed therebetween, the periphery defined by a linear top edge, a first linear side edge perpendicularly situated with respect to the top edge with a beveled corner formed therebetween, and a second side edge with a linear top extent perpendicularly situated with respect to the top edge and a bottom extent beveled inwardly from the top extent to a bottom edge of the periphery, the bottom edge having a square cut out formed therein and in communication therewith, the balance shaft seal retainer further including a pair of apertures formed adjacent the top edge and respective sides edges of the periphery thereof;

a ring shaped spacer with a planar configuration; and a pair of bolts for being situated within the apertures of the retainer and screwably coupled within the threaded bores of the engine with the spacer situated about one of the bolts between the retainer and engine within the recess thereof, whereby the square cut out encompasses the balance shaft seal thereby precluding the inadvertent removal of the same.

2. A balance shaft seal retainer system for use with an engine timing belt assembly including a shaft rotatably coupled within a cylindrical bore formed within an engine wherein the bore has an annular indentation formed thereabout, the shaft having an exterior disk shaped pulley coupled in concentric relationship therewith and in rotatable communication with a timing belt of the timing belt assembly, the engine having at least one threaded bore formed therein adjacent the shaft, the balance shaft seal retainer system further adapted for use with a balance shaft seal having a planar annular configuration, the balance shaft seal situated within the annular indentation about the shaft and between the pulley and the engine during use, the balance shaft seal retainer system comprising:

a balance shaft seal retainer having a square cut out formed therein, the balance shaft seal retainer further including at least one aperture formed therein; and at least one bolt for being situated within the aperture of the retainer and screwably coupled within the threaded bores of the engine whereby the square cut out encompasses the balance shaft seal thereby precluding the inadvertent removal of the same.

3. A balance shaft seal retainer system as set forth in claim 2 wherein the retainer has a planar generally square configuration with a front smooth planar face, a rear smooth planar face and a periphery formed therebetween, the periphery defined by a linear top edge, a first linear side edge perpendicularly situated with respect to the top edge with a beveled corner formed therebetween, and a second side edge with a linear top extent perpendicularly situated with respect to the top edge and a bottom extent beveled inwardly from the top extent to a bottom edge of the periphery.

4. A balance shaft seal retainer system as set forth in claim 2 wherein one of the threaded bores resides in a recess formed in the engine and further included is a ring shaped spacer with a planar configuration, whereby the spacer is situated about one of the bolts between the retainer and engine within the recess thereof.

* * * * *